United States Patent
Thünemann et al.

(12) 
(10) Patent No.: US 6,486,245 B1
(45) Date of Patent: Nov. 26, 2002

(54) SELF-ARRANGING COATING

(75) Inventors: Andreas Thünemann, Berlin; Helmut Lochhaas, Wiesbaden, both of (DE)

(73) Assignee: Nanogate Technologies GmbH, Saarbrücken (DE)

(*) Notice: Subject to any disclaimer, the term of this patent is extended or adjusted under 35 U.S.C. 154(b) by 0 days.

(21) Appl. No.: 09/530,730

(22) PCT Filed: Nov. 6, 1997

(86) PCT No.: PCT/EP97/06173

§ 371 (c)(1),
(2), (4) Date: Jun. 19, 2000

(87) PCT Pub. No.: WO99/24513

PCT Pub. Date: May 20, 1999

(51) Int. Cl.$^7$ .............................. C08K 5/09; C08K 5/41; C08K 5/53
(52) U.S. Cl. ...................... 524/130; 524/133; 524/165; 524/167; 524/173; 524/284; 524/300
(58) Field of Search ................ 324/284, 300, 324/130, 133, 165, 167, 173

(56) References Cited

U.S. PATENT DOCUMENTS 4,492,781 A    1/1985    Duszak

FOREIGN PATENT DOCUMENTS

| DE | 3942113 | 2/1991 |
|----|---------|--------|
| WO | 9301243 | 1/1993 |
| WO | 9724407 | 7/1997 |

OTHER PUBLICATIONS

Highly Ordered Materials with Ultra–Low . . . Complexes with Fluorinated Surfactants, Antonietti, et al., Adv. Mater. 1996, 8, No. 1—pp. 41–44.
High Performance Coating Material, Fluorine in Coatings II, Munich 24–24, 2/97, Lochhaas et al., Feb. 1997.

*Primary Examiner*—Edward J. Cain
(74) *Attorney, Agent, or Firm*—Fulbright & Jaworski L.L.P.

(57) ABSTRACT

The invention relates to a coating composition, to a formulation comprising said coating composition, to methods of coating surfaces with the coating composition, and to articles coated with the coating composition. The coating composition is based on a complex of polyelectrolytes and oppositely charged surfactants. The surfactants contain fluorine bonded covalently to carbon atoms. The coating material imparts oleophobic and/or hydrophobic properties to various surfaces. The degree of hydrophobicity and other properties such as, for instance, gas or moisture permeation can be adjusted over a wide range. Through the use of additives, the coating can be executed as a permanent or temporary coating. The readily variable profile of properties, the uncomplicated application, and the low coat thickness result in a wide scope for application as, for example, an antisoiling, antigraffiti or antiadhesion coating.

49 Claims, 3 Drawing Sheets

SELF-ARRANGING COATING

DESCRIPTION

The invention relates to a coating composition, to a formulation comprising said coating composition, to methods of coating surfaces with the coating composition, and to articles coated with the coating composition. The coating composition is based on a complex of polyelectrolytes and oppositely charged surfactants. The surfactants contain fluorine bonded covalently to carbon atoms. The coating material imparts oleophobic and/or hydrophobic properties to various surfaces. The degree of hydrophobicity and other properties such as, for instance, gas or moisture permeation can be adjusted over a wide range. Through the use of additives, the coating can be executed an a permanent or temporary coating. The readily variable profile of properties, the uncomplicated application, and the low coat thickness result in a wide scope for application as, for example, an antisoiling, antigraffiti or antiadhesion coating.

In the field of coating techniques, there exists a virtually innumerable number of different coating materials, each for very specific applications. In some cases a combination of polyelectrolytes and surfactants has been described.

DE 42 20 975 A1 describes oleophobic and/or permanent hydrophobic finishing for polymeric surfaces with a thin film. The film is formed from at least one layer of a water-soluble polycation and/or of a cationic synthetic resain. To further improve the oleophobic and/or permanently hydrophobic properties, the film may further comprise a long-chain surfactant or an alkyl-substituted polyanion. In the process described, the surface is first treated with a polycation solution and then treated, if desired, with an alkyl-substituted polyanion as second component or with a long-chain surfactant. Therefore, at least two different operations are required for coating. Furthermore, a prerequisite for application of the process is that the surface to be coated possesses a negative zeta potential.

This layer-by-layer construction by adsorption from aqueous solution has already been used for many years for scientific purposes and is described in a review by Decher (Science 277 (1997), 1232–1237).

International Patent Application Wo 96/11981 describes a fluorocarbon-containing additive which is applied subsequently to painted substrates and protects them against soiling or makes them easier to clean. These additives are based on discrete oligomers comprising a polyfunctional oligomeric core to which fluorinated alkyl chains are bonded covalently. The dirt repellency feature is achieved through the fluorinated alkyl chains, while adhesion to the paint is induced by the functionalized core. This type of protection by means of additives is strongly limited to well-defined, i.e. dust-free, painted surfaces. Furthermore, reaction times of from 6 hours to two weeks are necessary for preparing the fluorinated additives.

U.S. Pat. No. 5,330,788 describes a temporary coating for surfaces, developed in particular for protecting automobiles in transit. The coating is based on a film-forming acrylic acid polymer, a nonionic acetylenically unsaturated surfactant, if desired, a phosphate ester surfactant, and a base for neutralization. The coating material can be removed rapidly in contact with a special alkaline aqueous medium, which is likewise described in the patent. Extremely disadvantageous are, apparently, the long drying times for the coating, which are stated as being "overnight" or 24 hours. Since the principal component, the polyacrylic acid, is a polyelectrolyte which finds application as a super-absorbent (used, for example, in diapers and to improve the water retention capacity of arid soils), it cannot be assumed that these drying times, which are unreasonably long from an economic standpoint, might be substantially reduced.

U.S. Pat. No. 5,387,434 describes an antigraffiti composition whose protective action derives from sodium silicate. Since this is soluble in water, the interface between substrate and environment must be made hydrophobic. This is achieved by means of latex, silicones, or waxes. Particularly suitable are microcrystalline wax emulsions which are stabilized by sodium lignin-sulfonate. Graffiti removal requires high-pressure steam jets with a pressure of 100 psi, and temperatures of up to 90° C. Consequently, this process is suitable only for very specific substrates which permit these conditions without damage. No statement concerning the drying time of the coating can be found in the patent. However, it must be assumed that the crosslinking of the silicate requires several hours to days. Furthermore, it is likely that drying, which is retarded as a result of the added wax, will likewise take at least one day under dry conditions.

DE 36 30 520 C1 describes a process for protecting applications of color to surfaces of natural and synthetic stone. The process consists of two steps: first, an inorganic impregnation is applied, which is not specified in any great detail. This is followed by the application of a color-accepting, detachable, wax-like coating which can be removed by means of high-pressure hot water. Owing to the fact that it necessitates at least two different operations, this process is very time-consuming. In the case of typical inorganic impregnations, from at least one to three days are necessary given dry weather. Furthermore, this process is applicable only to a very limited number of specific substrates.

European Patent Application EP 0 695 772 A1 describes a class of fluorine-containing polyethers which are applied to masonry where they crosslink and form an impermeable antigraffiti film. The synthesis of the crosslinkable substances, however, is time-consuming and costly, and the raw material applied requires a drying time of 48 hours on the masonry in order to crosslink sufficiently. Furthermore, the field of use is limited to the coating of masonry.

Available on the market there is a surface protection is system from the company PSS (Protective Surface System) which is based or a polysaccharide mixture. According to an examination certificate from the German Federal Institute of Materials Research (Report No. 3.14.3441-91), effective protection against graffiti with the system PSS 20 requires three coats with drying times of from 24 to 72 hours in each case. Thus from 3 to 9 days are necessary for the application of the protective coat.

All of the abovementioned coating processes are characterized by a closely limited field of use and, in some cases, by drying times of several days for the protective coats.

DE-A-44 28 641 describes mesomorphic complexes comprising anionic polyelectrolytes, cationic polyelectrolytes and/or polyampholytes, and cationic, anionic, nonionic and/or amphoteric surfactants. As a consequence of the mesomorphic structure, generally improved material properties, such as increased mechanical strength, for example, are expected. The materials constructed of these amorphous or mesomorphic polyelectrolytes, such as films or membranes, include as an essential component surfactants having a hydrocarbon framework. Coatings with low-energy surfaces, however, cannot be produced using the fluorine-free complexes described therein.

Antonietti et al. (Adv. Mater. 8 (1996), 41–45) and Lochhaas et al. (Polyelectrolyte-surfactant complexes with fluorinated surfactants: A new type of material for coatings (3$^{rd}$ conference in the series: High Performance Coating Materials, Fluorine in Coatings II, Feb. 24–26, 1997, Munich, Germany) describe complexes comprising cationic polyelectrolytes and anionic fluorinated surfactants. Cationic polyelectrolyte components disclosed include polyacrylic acid, polymethacrylic acid, and poly (diallyldimethylammonium chloride). On contact with moisture these complexes have a very high propensity to absorb water; they swell rapidly and in doing so become soft to gelatinous. This leads to a considerable deterioration in the mechanical properties, so rendering them unsuitable for practical applications as coating material.

It is an object of the present invention to develop a coating material in which at least some of the disadvantages of the prior art are eliminated. In particular, the coating material should be applicable by simple methods to any desired surfaces and should produce a low-energy surface even when small amounts are used. Furthermore, the coating material should be highly stable to a water-containing environment.

This object is achieved through the provision of a coating material based on a complex which comprises at least one nonhygroscopic polyelectrolyte and at least one oppositely charged, fluorinated surfactant.

The coating material of the invention surprisingly allows an accumulation of fluorinated organic groups—alkyl chains, for example—at its surface, so that the oleophobic— or hydrophobic—properties of the coated surface are improved. Through the combination of nonhygroscopic polyelectrolyte and fluorinated ionic surfactant a highly ordered, mechanically stable complex is formed which both adheres to almost any substrate and forms a highly fluorinate, low-energy surface. Sufficient adhesion and the formation of low-energy surfaces are inherently contradictory principles, which can surprisingly be unified in one material by the novel combination of nonhygroscopic polyelectrolyte and fluoro surfactant.

The complex of the invention may comprise a cationic polyelectrolyte and an anionic surfactant, or an anionic polyelectrolyte and a cationic surfactant. It is preferred to use cationic polyelectrolytes and anionic surfactants.

The stoichiometry of the complex, based on the charges of polyelectrolyte and surfactant, is preferably such that there is essentially charge compensation in respect of the polyelectrolyte on the one side and surfactant on the other. Advantageously, therefore, the stoichiometry of the complex, based on the charges of polyelectrolyte and surfactant, is from about 1.5:1 to 1:1.5, with particular preference from about 1.3:1 to 1:1.3, and most preferably about 1:1.

In addition, the complex preferably has a mesomorphic structure, as may be determined by measuring the small-angle X-ray scattering. It is further preferable that the complexes of the invention possess no crystallinity, as can be determined by measuring the wide-angle X-ray scattering.

The complexes of the invention are obtainable by adding an aqueous solution of the polyelectrolyte to an aqueous solution of the fluorinated surfactant and isolating the resultant precipitate, which forms spontaneously. Both when adding a cationic polyelectrolyte in aqueous solution to an aqueous solution of the anionic fluorinated surfactant, and when adding an anionic polyelectrolyte to a cationic fluorinated surfactant, the complex preferred in accordance with the invention is formed with a stoichiometry of about 1:1, based on the charges of polyelectrolyte and surfactant. Moreover, the formation of this preferred complex is favored by working at an elevated temperature of at least 40° C., with particular preference from 50 to 90° C. In the converse case—the addition of a surfactant solution to the polyelectrolyte solution—it is not unusual for there to be considerable deviations from the preferred stoichiometry, which in certain instances may result in an unwanted sharp increase in the hygroscopicity.

The resultant novel supramolecular polymer complex precipitate may be dissolved in polar organic solvents. This is surprising, since polymeric materials having a high fluorine content are usually of extremely low solubility or else completely insoluble. When this complex solution is applied to a surface and the solvent is evaporated, a thin, usually transparent film of the complex material is formed on the surface. It has been found that the surface energy after coating with the complex materials of the invention was lower in all cases than prior to coating. A consequence of this is reduced adhesion of impurities on the surface. This effect was found on a large number of different surfaces, examples being glass, stone, wood, paper, metal, plastics, natural materials such as cotton fibers, for instance, and on painted surfaces as well; in other words, the effect is independent of the type of substrate and is accompanied by good coating adhesion.

A further surprising finding has been that the complexes of the invention are readily emulsifiable with nonionic surfactants, preferably nonionic fluorinated surfactants. In this way, the complexes may also be processed with an aqueous carrier material and hence applied in a particularly environment-friendly way.

The present invention therefore further provides a complex comprising polyelectrolyte and ionic fluorinated surfactant, said complex further comprising at least one nonionic surfactant, preferably a nonionic fluorinated surfactant. The proportion of the nonionic surfactant may be varied over a wide range depending on the nature of the application and may, for example, be up to 200% (w/w) based on the weight of the complex.

By varying the proportion of emulsifier, i.e., nonionic surfactant, it is possible to control the permanence of the coating. For the application of permanent coatings, the proportion of the nonionic surfactant should be up to not more than 20%, preferably up to 10% and, with particular preference, up to 5%, based in each case on the weight of the complex. For temporary coatings, proportions of the nonionic surfactant of from 20 to 200% and, in particular, from 50 to 80%, based on the weight of the complex, are preferred. With a high proportion of emulsifier, the coating may be washed off using customary domestic surfactant solutions. This is of great interest in particular for the temporary intransit coating of, say, automobiles.

It has been found, furthermore, that the gas permeability and water absorption capacity may both be varied widely by means of appropriate combinations of polyelectrolyte and surfactant. This is of great importance since with many coatings, such as antigraffiti coats, for example, it is necessary not to seal the surfaces, in order to prevent the formation of mold and fungus.

The complex compounds of the invention can be prepared easily and quickly, from aqueous solution, for example.

They can be processed both as solutions and as aqueous emulsions to form thin films on any desired surfaces. For very low expenditure of material, these films greatly reduce the surface energy, and so can be used almost universally wherever surfaces having Teflon-like properties are required or desired.

Owing to the low coat thicknesses required to reduce the surface energy, the ease of preparation, and the short drying times, the coating is very cost-effective per unit area. The drying times of the films may be reduced to a few minutes or hours. The coating permits elastic flexing of the coated articles. The film coatings are preferably transparent and are impossible or difficult to perceive under light which is incident, for example, at an oblique angle. The breathability, i.e., the permeability to gases and water vapor, and also water absorption, can be adjusted within wide limits.

The coating of surfaces with the polyelectrolyte-fluoro surfactant complexes of the invention is always judicious when the aim is to reduce natural or artificial soiling. For this purpose the surface is coated with a thin film. Irrespective of the nature of the surface, the surface energy is reduced as a result of the coating. The coating permits elastic flexing of the coated article without chipping or flaking. The films possess long-term stability at temperatures of up to 100° C. Depending on the complex used, temperature stabilities of from 120 up to 230° C. may even be attained.

With the exception of highly hygroscopic polyelectrolytes such as polyacrylic acid, polymethacrylic acid and poly (diallyldimethylammonium chloride), and salts thereof, any desired combinations of polyelectrolytes and fluorinated ionic surfactants are suitable. When using nonhygroscopic polyelectrolytes of the invention, the complexes obtained have a low water absorption of preferably not more than 5% (w/w), with particular preference not more than 4.5% (w/w), and most preferably not more than 4% (w/w), based on the weight of the complex, at 20° C. and 100% relative atmospheric humidity.

Polyelectrolytes are substances containing two or more positive or negative charge carriers. A preferred class of cationic polyelectrolytes are polymers containing preferably at least 20% of one or more of the following monomer units, with the proviso that the resultant polyelectrolyte is a nonhygroscopic polyelectrolyte within the meaning of the present invention:

ethylenically unsaturated monomers which carry positively charged nitrogen groups, e.g., quaternary ammonium groups or N-substituted heteroaromatic groups, said monomers being in the form either of salts, as obtained by reacting basic amino functions with mineral acids, e.g., hydrochloric acid, sulfuric acid or nitric acid, or in quaternized form (e.g., by reaction with dialkyl sulfates such as dimethyl sulfate, diethyl sulfate, etc., alkyl chlorides such as methyl chloride, ethyl chloride, etc., or benzyl chloride), examples being dimethylaminoethyl acrylate hydrochloride, diallyldimethylammonium chloride, dimethylaminoethyl acrylate methosulface, di-methylaminopropylmethacrylamide methochloride, di-methylaminopropylmethacrylamide methosulfate, vinylpyridinium salts, and 1-vinylimidazolium salts.

In addition to the cationic monomer units, the cationic polyelectrolyte may if desired contain one or more nonionic monomers in an amount, for example, of up to 80 mol %. The presence of nonionic monomers is necessary in some instances, as in the case of poly(diallyldimethylammonium chloride), for example, in order to reduce the hygroscopicity.

Examples of suitable nonionic monomers are $C_1$ to $C_{20}$ alkyl esters and hydroxyalkyl esters, and especially amides and N-substituted amides, of monoethylenically unsaturated $C_3$ to $C_{10}$ monocarboxylic acids or $C_4$ to $C_8$ dicarboxylic acids, e.g., acrylamide, methacrylamide, N-alkylacrylamides or N,N-dialkylacrylamides having in each case 1 to 18 carbon atoms in the alkyl group, such as N-methylacrylamide, N,N-dimethylacrylamide, N-tert-butylacrylamide or N-octadecylacrylamide, N-methylhexylmaleimide, N-decylmaleimide, dimethylaminopropylmethacrylamide or acrylamidoglycolic acid, and also alkylaminoalkyl (meth)acrylates, examples being di-methylaminoethyl acrylate, dimethylaminoethyl methacrylate, ethylaminoechyl acrylate, diethylaminoethyl methacrylate, dimethylaminopropyl acrylate and di-methylaminopropyl methacrylate, and also vinyl esters, examples being vinyl formate, vinyl acetate and vinyl propionate, which after polymerization may also be present in hydrolyzed form, and also N-vinyl compounds, examples being N-vinylpyrrolidone, N-vinylcaprolactam, N-vinylformamide, N-vinyl-N-methylformamide, 1-vinylimidazole, 1vinyl-2-methylimidazole, and N-methylvinylacetamide.

An example of cationic polyelectrolytes composed of cationic and nonionic monomers is as follows:

copolymers of dialkenyldialkylanmonium salts, e.g., diallyldimethylammonium chloride, with nonionic monomers, e.g., N-methylvinylacetamide, in which the proportion of nonionic monomer is preferably at least 20 mol %.

Further preferred classes of cationic polyelectrolytes are the following:

polyethyleneimines and alkyl-substituted polyethyleneimines, e.g., poly(ethyleneimine-co-N-docosylethylimine);

ionenes, i.e., polymers having two or more quaternary ammonium groups and formed, for example, by reacting di-tertiary amines with α,ω-dihaloalkenes, e.g., 6,3-ionene, and polysaccharides containing cationic groups, especially β-glycosidically linked polysaccharidea, such as chitosan, for instance.

To prepare the complexes of the invention, said cationic polyelectrolytes can be used in base form, partially neutralized or tully neutralized.

In addition, anionic polyelectrolytes are also suitable for the method of the invention. A preferred class of such anionic polyelectrolytes are polymers containing preferably at least 20 mol % of one or more of the following monomer units, with the proviso that the resultant polyelectrolyte is a nonhygroscopic polyelectrolyte within the meaning of the present invention:

ethylenically unsaturated carboxylic acids and their salts and derivatives, e.g., $C_3$ to $c_{10}$ mono-carboxylic acids, their alkali metal and/or ammonium salts, examples being dimethylacrylic acid or ethylacrylic acid, $C_4$ to $C_8$ dicarboxylic acids, their monoesters, anhydrides, alkali metal salts and/or ammonium salts, e.g., maleic acid, fumaric acid, itaconic acid, mesaconic acid, methylenemalonic acid, citraconic acid, maleic anhydride, itaconic anhydride or methylmalonic anhydride;

ethylenically unsaturated monomers containing sulfonic acid groups, examples being allylsulfonic acid, styrenesulfonic acid, vinylsulfonic acid, 3-sulfopropyl acrylate, and 3-sulfopropyl methacrylate, monoethylenically unsaturated monomers containing phosphinic, phosphonic or phosphoric acid groups, e.g., vinylphosphonic acid, allylphosphonic acid, or acrylamidomethylpropanephosphonic acid.

If desired, these anionic polymers may contain one or more of the abovementioned nonionic monomers in a proportion, for example, of up to 80 mol %. The use of copolymers comprising anionic and nonionic monomers is preferred for some of the anionic monomers in order to reduce the hygroscopicity.

A further preferred class of anionic polyelectrolytes are polyaccharides containing anionic groups.

The anionic polyelectrolytes can be used in the acid form, partially neutralized or fully neutralized.

Ionic fluorinated surfactants are substances which contain at least one fluorine atom attached to a carbon atom, preferably at least one —$CF_2$ group and/or $CF_3$ group, and at least one charge carrier.

Anionic fluorinated surfactants comprise at least one fluorine-containing hydrophobic group and at least one negative charge carrier. Examples of such compounds are fluorinated carboxylic acids and their salts with organic or inorganic cations, fluorinated sulfonic acids and their salts with organic or inorganic cations, fluorinated organic sulfuric acids and their salts with organic or inorganic cations, and fluorinated phosphinic, phosphonic or organ-phosphoric acids and their salts with organic or inorganic cations.

Among these classes of compound, preference is given to the following;

perfluorocarboxylic acids and their preferably water-soluble salts, such as perfluoroalkanoic acids, e.g., in particular, perfluoroalkanoic acids of the formula $CF_3(CF_2)_n$—COOH, where n is preferably $\geq 7$;

partially fluorinated carboxylic acids and carboxylic acid salts, such as partially fluorinated alkanoic acids, partially fluorinated alkenoic acids, perfluoroalkoxyalkanoic acids, perfluoroalkylethyleneoxyalkanoic acids, perfluoroalkoxybenzoic acids, and partially fluorinated carboxylic acids containing sulfide, sulfone, carboxamide, hydroxyl, oxo and/or ether groups, and salts of such acids; e.g., lithium 3-[(1H, 1H, 2H, 2H-fluoroalkyl) thio]propionate, Zonyl FSA®, Du Pont;

perfluorosulfonic acids and their preferably water-soluble salts, such as perfluoroalkanesulfonic acids of the formula $CF_3(CF_2)_m$—$SO_3H$, where $m \geq 1$;

partially fluorinated sulfonic acids and their preferably water-soluble salts, such as partially fluorinated alkanesulfonic acids, e.g., perfluoroalkylethaniesulfonic acids, perfluoropropylalkanesulfonic acids, partially fluorinated arylsulfonic acids, e.g., perfluoroalkylbenzenesulfonic acids, perfluoroalkoxybenzenesulfonic acids, perfluoroacylbenzenesulfonic acids, partially fluorinated alkenesulfonic acids, and also partially fluorinated sulfonic acids containing sulfide, carboxamide, hydroxyl, oxo and/or ether groups, fluorinated sulfo esters, e.g., sulfosuccinic esters, perfluoroalkyl sulfopropionates, perfluoroalkyl sulfobutyrates and salts thereof; e.g. perfluoroalkylethylsulfonic acid ammonium salt, Zonyl TBS® Du Pont; sodium [succinic acid diperfluoroalkylethyl diester 2-sultonate], Fluowet SB®, Hoechst;

fluorinated organic sulfuric acids and their salts, such as perfluoroalkylated methyl sulfates, fluorinated sulfatopoly(oxyethylene), perfluoropropoxylated sulfates, and salts thereof;

fluorinated phosphinic and phosphonic acids and their preferably water-soluble salts, e.g., Fluowet PL80®, Hoechst;

fluorinated organic phosphoric acids and their salts, such as perfluoroalkylethanephosphoric acids, mono- and bis(fluoroalkyl)phosphoric acids, perfluoroalkylphosphoric acids, fluorinated alkene-phosphoric acids, fluorinated phosphate alkyl esters, e.g., phosphoric acid perfluoroalkyl ester ammonium salt, Zonyl FSE® and Zonyl FSP®, Du Pont.

Cationic surfactants are also suitable for the method of the invention. Preferred classes of such compounds are as follows:

fluorinated amines and ammonium salts, such as fluoroalkylammonium salts, which may if desired contain carboxamide, sulfonamide, sulfide, ester and/or hydroxyl groups, or heterocyclic nitrogen compounds, e.g., perfluoroalkylethyltrialkylammonium methosulfate, Hoe-L-3658-1, Hoechst.

Examples of nonionic surfactants, especially fluorinated surfactants, are compounds containing one or more nonionic hydrophilic groups and one or more fluorine-containing hydrophobic groups. Preferred examples of such compounds are fluorinated alcohols, examples being those containing one or more oxyethylene or oxypropylene groups, fluorinated polyethers, fluorinated polyhydric alcohols, oxyalkylated perfluorophenols, perfluoroalkyl-2-ethanethiol derivatives, and also compounds containing carboxamide or sulfonamide groups.

Further judicious ionic fluorinated surfactants that can be used to prepare the complexes, and nonionic fluorinated surfactants that can be used as emulsifiers to prepare aqueous emulsions, are described in the book by Erik Kissa (Fluorinated Surfactants, Surfactant Science Series Vol. 50, Marcel Dekker, Inc., New York, 1994)

Complexes of the invention further comprising a nonionic surfactant are preferably prepared by adding the particular desired proportion of nonionic surfactant to a complex comprising polyelectrolyte and fluorinated ionic surfactant.

The present invention further provides a formulation comprising a complex of the invention, comprising polyelectrolyte and ionic fluorinated surfactant, in solution in a polar organic solvent. Said formulation comprises the complex preferably in a proportion of from 0.1 to 30% (w/w), with particular preference from 0.5 to 10% (w/w), and most preferably from 1 to 5% (w/w), based on the weight of the formulation. The solvent is preferably a volatile and largely nontoxic organic solvent, examples being methanol, ethanol, acetone, ethyl acetate, and mixtures thereof.

The present invention additionally provides a formulation comprising a complex of the invention, comprising polyelectrolyte and ionic fluorinated surfactant, and preferably nonionic surfactant, in emulsion in an aqueous solvent. The complex is present preferably in a proportion of from 0.1 to 30% (w/w), with particular preference from 0.5 to 10% (w/w), and most preferably from 1 to 5% (w/w), based on the weight of the emulsion. The emulsion of the invention is, surprisingly, stable at 20° C. for at least two weeks.

The emulsion of the invention is obtainable by adding the particular desired amount of a nonionic surfactant to a complex comprising polyelectrolyte and ionic fluorinated surfactant, converting this mixture into a substantially homogeneous mixture, and diluting that mixture with water, preferably in portions, so as to obtain an aqueous emulsion.

The complexes of the invention, and the complex-containing compositions, might be used to coat surfaces. Exemplary applications are as antisoiling compositions, especially antigraffiti compositions, as protective compositions for vehicles in transit, e.g., automobiles or machines, as anti-icing protection, especially for civilian or military air travel, as marine antifouling coatings, as release agents and lubricants, in the production, for example, of tiles, bricks or construction shuttering, as compositions for impregnating textiles, e.g., cotton with GoreTex properties, and carpeting, and as a membrane, e.g., as a gas separation membrane.

The invention further provides a method of coating a surface, in which a formulation of the invention is applied to said surface and allowed to dry. This coating operation may—where necessary—also be repeated, using different complexes in each case if desired. Application may be made from an organic solution or from an aqueous emulsion. The drying time for organic solutions is preferably not more than 1 hour, with particular preference from a few seconds to a few minutes. The drying time for aqueous emulsions is preferably not more than 6 hours, with particular preference not more than 3 hours. The coating composition may be applied discontinuously or continuously by means of customary techniques such as, for instance, spraying, flow coating, dipping, or mechanical application, e.g., roller application. The thickness of the coating is preferably from 0.1 $\mu$m to 1 mm, with particular preference from 1 to 10 $\mu$m.

The present invention provides, further still, an article coated at least in part with a coating comprising a complex of the invention comprising polyelectrolyte and fluorinated ionic surfactant. The coated surface preferably has an energy of less than 20 mN/m. The coating is preferably substantially transparent, ie., transparent to visible light. Further, the coating is preferably stable to contact with a water-containing atmosphere; that is, it does not tend toward significant swelling. Furthermore, the coating is preferably stable up to a temperature of 100° C. Depending on what is required, the coating may be permanent or temporary, permeable to air and/or moisture, or impermeable to air and/or moisture.

One advantage of the coatings of the invention is that at their surface facing the surroundings they have a heightened fluorine content as compared with the interior of the coating, a fact which contributes to reducing the surface energy. Furthermore, they possess preferably a contact angle hysteresis of between 5° and 20°. In addition, the coatings of the invention exhibit low water absorption, preferably not more than 5% (w/w), with particular preference not more than 4.5% (w/w), and most preferably not more than 4% (w/w), based on the weight of the coating, at 20° C. and 100% relative atmospheric humidity.

The invention is further illustrated by the following figures and example. In the figures.

EXAMPLES

1. Preparation of Complexes

The drying times stated in the examples are 12 h in many cases. They were chosen so as to be long enough to allow precise determination of the yields. For commercial purposes, short drying times of approximately 30 minutes, or no drying times, are sufficient. The complexes can also be used further without drying under reduced pressure.

1.1 Complexes of Poly(diallyldimethylammonium)

None of the complexes containing poly(diallyldimethylammonium) as polyelectrolyte can be used as a coating material since in the presence of moisture the water absorption is so high that there is severe swelling. Since very different surfactants were tested, the swelling may be attributed to the polyelectrolyte. They are listed here in order to show that they are markedly inferior to the complexes of the invention. Similar results are found with complexes containing polyacrylic or polymethacrylic acid as polyelectrolyte.

1.1.1 Poly(diallyldimethylammonium)-Fluowet SB®

18 g (28% w/w, 5.5 mmol, 1.1 eq) of Fluowet SB® are introduced in 150 ml of deionized water (0.037 M). A solution of 0.81 g (5 mmol, 1 eq) of poly(diallyldimethylammonium chloride) in 50 ml of deionized water (1.6% w/w) is added dropwise (about 1 drop per second) with stirring at room temperature. Using a Büchner funnel, the precipitate is filtered off immediately then washed (3 times 20 ml of water conditioned to 60° C.) and dried in a vacuum drying cabinet at 30° C. and 0.1 mbar for 12 h. The yield is 4.5 g (88% of theory).

A poly(diallyldimethylammonium)-Fluowet PL80® complex is prepared analogously. The yield is 87% of theory.

1.1.2 Poly(diallyldimethylammonium)-Zonyl FSA®

4.0 g (25% w/w) of Zonyl FSA® are dissolved in 150 ml of deionized water. The solution is adjusted to a pH of 9 using aqueous sodium hydroxide solution (10% w/w). A solution of 0.1 g of poly(diallyldimethylammonium chloride) (0.62 mmol) in 50 ml of deionized water is added slowly (1 drop per second) with stirring at 50° C. Subsequently, the pH is adjusted to 3 using hydrochloric acid (10% strength). A fine white precipitate is produced which is filtered off using a Büchner funnel, washed (with 3 times 20 ml of water conditioned at 60° C.) and dried in a vacuum drying cabinet at 30° C. and 0.1 mbar. The yield is 0.3 g (84% of theory, assuming 0.28 g of $C_6F_{13}CH_2CH_2SCH_2CH_2COOLi$).

The following complexes are prepared analogously:

poly(diallyldimethylammonium)-Zonyl FSE® (90% yield)

poly(diallyldimethylammonium)-Zonyl FSP® (80% yield)

poly(diallyldimethylammonium)-Zonyl TBS® (84% yield)

poly(diallyldimethylammonium) n-perfluorobutanesulfonate (75% yield)

poly(diallyldimethylammonium) n-perfluorooctanesulfonate (86% yield)

1.1.3 Poly(diallyldimethylammonium) 1H,1H,2H,2H-perfluoroethylsulfonate 0.5 g (1.17 mmol, 1.6 eq) of 1H,1H,2H,2H-perfluoroethylsulfonic acid are introduced in 50 ml of deionized water and the pH is adjusted to 7 using aqueous sodium hydroxide solution (10% w/w). 0.17 g of poly(diallyldimethylammonium chloride) (1.06 mmol, 1.0 eq) in 50 ml of deionized water is added slowly (1 drop per second) with stirring at room temperature. A fine white precipitate is produced which is immediately filtered off using a Büchner funnel, washed (with 3 times 20 ml of water conditioned at 60° C.) and dried in a vacuum drying cabinet at 30° C. and 0.1 mbar. The yield is 0.50 g (86% of theory).

1.2 Complexes of the Random Cationic Copolymer Poly-(diallyldimethylammonium)-co-N-methyl-N-vinyl-acetamide in Different Charge Density with Perfluorinated Carboxylic Acids The following series of copolymers was prepared in order to investigate the influence of charge density on the water absorption and the surface properties.

1.1 eq of n-perfluorocarboxylic acid ($F(CF_2)_pCOOH$) are introduced in 100 ml of deionized water and the pH is adjusted to 9 using aqueous sodium hydroxide solution (10% w/w). A solution of 1.0 eq of a random copolymer of diallyldimethylammonium chloride (DADMAC, 1 eq) and N-methyl-N-vinylacetamide (NMVA) in 50 ml of deionized water is added slowly (1 drop per second) with stirring at 60° C. (or 80° C. for the long-chain acid where p=17) Following adjustment of the pH to 3 using hydrochloric acid (10% w/w), a white precipitate is produced. This precipitate is filtered off immediately using a Büchner funnel, then washed (with 3 times 20 ml of water conditioned to 60° C.) and dried in a vacuum drying cabinet at 30° C. and 0.1 mbar.

TABLE 1

Perfluorocarboxylic acids used

| Perfluorocarboxylic acid | Molecular weight g/mol | Purity % |
|---|---|---|
| $F(CF_2)_6COOH$ | 364.06 | 99 |
| $F(CF_2)_7COOH$ | 414.07 | 96 |
| $F(CF_2)_9COOH$ | 514.08 | 98 |
| $F(CF_2)_{17}COOH$ | 914.15 | 95 |

TABLE 2

PE-T complexes

| Complex DADMAC/NMVA (m:n) - $F(CF_2)_pCOO$ | Mass $F(CF_2)_pCOOH$ in g | Mass DADMAC/ NMVA in g | Yield in g (% of theory) |
|---|---|---|---|
| DADMAC/NMVA (25:75) - $F(CF_2)_7COO$ | 0.31 | 0.30 | 0.32 (59) |
| DADMAC/NMVA (25:75) - $F(CF_2)_9COO$ | 0.38 | 0.30 | 0.43 (71) |
| DADMAC/NMVA (25:75) - $F(CF_2)_{17}COO$ | 0.69 | 0.30 | 0.76 (87) |
| DADMAC/NMVA (47:53) - $F(CF_2)_7COO$ | 0.52 | 0.30 | 0.45 (63) |
| DADMAC/NMVA (47:53) - $F(CF_2)_9COO$ | 0.63 | 0.30 | 0.62 (75) |
| DADMAC/NMVA (47:53) - $F(CF_2)_{17}COO$ | 1.16 | 0.30 | 1.16 (92) |
| DADMAC/NMVA (65:35) - $F(CF_2)_7COO$ | 0.66 | 0.30 | 0.60 (72) |
| DADMAC/NMVA (65:35) - $F(CF_2)_9COO$ | 0.80 | 0.30 | 0.83 (86) |
| DADMAC/NMVA (65:35) - $F(CF_2)_{17}COO$ | 1.48 | 0.30 | 1.45 (95) |
| DADMAC/NMVA (83:17) - $F(CF_2)_7COO$ | 0.78 | 0.30 | 0.97 (85) |
| DADMAC/NMVA (83:17) - $F(CF_2)_9COO$ | 0.95 | 0.30 | 1.20 (89) |
| DADMAC/NMVA (83:17) - $F(CF_2)_{17}COO$ | 1.75 | 0.30 | 1.97 (91) |
| DADMAC/NMVA (100:0) - $F(CF_2)_6COO$ | 1.00 | 0.40 | 0.69 (57) |
| DADMAC/NMVA (100:0) - $F(CF_2)_7COO$ | 1.00 | 0.34 | 0.88 (77) |
| DADMAC/NMVA (100:0) - $F(CF_2)_9COO$ | 1.00 | 0.28 | 0.87 (79) |
| DADMAC/NMVA (100:0) - $F(CF_2)_{17}COO$ | 1.00 | 0.17 | 0.97 (90) |

1.3 Polyethyleneimine Perfluorooctanoate 54 g (130 mmol) of perfluorooctanoic acid (Fluka Chemie) are dissolved in 500 ml of water at 50° C. A clear viscosity solution is formed. 100 ml of aqueous polyethyleneimine solution (20° C.) are added dropwise over 5 minutes with stirring. The solution contains 5.6 g (130 mmol) of polyethyleneimine (Aldrich Chemie, 50% by weight aqueous solution, branched, $M_n \approx 70,000$, $M_w = 750,000$). A white precipitate is formed immediately and care must be taken to ensure that the reaction solution is mixed thoroughly. Since the mixture is very viscous, this is best done with a coarse stirrer mechanism (e.g., KPG stirrer at 600–700 rpm). Complexation is exothermic and there is a temperature rise of about 5° C. to 54–56° C. Following addition of the polyethyleneimine solution, stirring is continued for 5 minutes and the precipitate is immediately separated from the aqueous phase using a fluted filter. The precipitate is dewatered in a drying cabinet at 50° C. and $10^{-1}$ mbar for 12 h, mortared and sieved. The product is a fine white homogeneous powder with a virtually quantitative yield (59.2 g).

1.4 Poly(ethyleneimine-co-N-docosylethyleneimine) n-perfluorononanoate 0.5 g (0.99 mmol, 1.1 eq) of n-perfluorononanoic acid is dissolved in 100 ml of water. A solution of 0.08 g (88 mmol, 1.0 eq) of poly(ethyleneimine-co-N-docosylethyleneimine) in 100 ml of deionized water is added slowly (1 drop per second) with vigorous stirring at a temperature of 70° C. The pH of the polyelectrolyte solution was adjusted beforehand to 2 using hydrochloric acid (10%). A white precipitate is produced spontaneously, filtered off immediately and washed with 200 ml of water at 70° C. The precipitate is dried at 30° C. and 0.1 mbar for 12 h. The yield is 0.29 g (55% of theory).

1.5 Complexes of Poly(N,N,N-trimethylammonium-3-propylacrylamide)

Poly(N,N,N-trimethylammonium-3-propylacrylamide) perfluorooctanoate 30 g (71.9 mmol) of perfluorooctanoic acid are dissolved in 1250 ml of water at 50° C. and the pH of the solution is adjusted to 6 using aqueous sodium hydroxide solution (10%). 13.51 g (65.4 mmol) of poly-(N,N,N-trimethylammonium-3-propylacrylamide chloride) (Stockhausen GmbH) are added dropwise to this solution with vigorous stirring over 5 minutes. The clear surfactant solution becomes cloudy immediately. Following the addition of the polyelectrolyte, stirring is continued for 5 minutes. The mixture is left to cool to room temperature and the aqueous phase is poured off. This leaves a transparent gelatinous residue. This residue is washed with 500 ml of water at 60° C. and then dried at 50° C. and $10^{-1}$ mbar for 12 h. The yield is 32.9 g (90% of theory)

Poly(N,N,N-trimethylammonium-3-propylacrylamide)-Fluowet SB®

15 g (28% w/w, 4.6 mmol, 1.1 eq) of Fluowet SB® are introduced in 150 ml of deionized water. A solution of 0.86 g (4.2 mmol, 1 eq) of poly(trimethylammonium chloride propylacrylamide) in 50 ml of deionized water adjusted to a pH of 2–3 with hydrochloric acid (10% w/w) is added slowly (1 drop per second) with stirring at room temperature. A precipitate is formed which is immediately filtered off with a Büchner funnel, then washed (with 3 times 20 ml of water conditioned at 60° C.) and dried in a vacuum drying cabinet at 30° C. and 0.1 mbar. The yield is 4.3 g (=98% of theory).

1.6 Poly(acryloyloxyundecyltrimethylammonium)n-perfluorooctanoate 0.61 g (1.47 mmol, 1.1 eq) of n-perfluorooctanoic acid are introduced in 100 ml of deionized water and the pH is adjusted to 9 using aqueous sodium hydroxide solution (10%). A solution of 0.43 g (1.35 mmol, 1.0 eq) of poly (acryloyloxyundecyltrimethylammoniumn chloride in 100 ml of deionized water is added slowly at 30° C. A fine white precipitate forms spontaneously, and is filtered off immediately with a Büchner funnel and washed with warm water. The precipitate is subsequently dried at 30° C. and 0.1 mbar for 12 h. The yield is 0.50 g (94% of theory).

1.7 Complexes of 6,3-ionene 6,3-ionene-Fluowet SB®

20 g (28% w/w, 6.1 mmol, 1.1 eq) of Fluowet SB® are introduced in 200 ml of deionized water. A solution of 1.04 g (2.8 mmol, 1 eq) of hexadimethrine dibromide (6,3-ionene) in 50 ml of deionized water is added slowly (1 drop per second) at a temperature of 35° C. A precipitate is formed which is filtered off with a Büchner tunnel, washed (with 5 times 20 ml of water conditioned at 60° C.) and dried in a vacuum drying cabinet at 30° C. and 0.1 mbar. The yield is 5.3 g (96% of theory).

6,3-ionene-Zonyl TBS®

20 g (28% w/w, 6.1 mmol, 1.1 eq) of Zonyl TBS® are introduced in 200 ml of deionized water. A solution of 1.04 g (2.8 mmol, 1 eq) of hexadimethrine dibromide (6,3-ionene) in 50 ml of deionized water is added slowly (1 drop per second) with stirring at a temperature of 35° C. A precipitate is formed which is immediately filtered off with a Büchner funnel, then washed (with 5 times 20 ml of water conditioned at 60° C.) and dried in a vacuum drying cabinet at 30° C. and 0.1 mbar. The yield is 5.3 g (=96% of theory).

1.8 Chitosan-Fluowet SB®

5.5 g (28% w/w, 1.7 mmol, 1.1 eq) of Fluowet SB® are introduced in 100 ml of deionized water. A solution of 0.25 g of chitosan (Aldrich, low molecular mass) in 50 ml of 1% acetic acid is added slowly with stirring (1 drop per second) at room temperature. A precipitate is formed which is filtered off immediately with a Büchner funnel, washed (with 3 times 20 ml of water conditioned at 60° C.) and dried in a vacuum drying cabinet at 30° C. and 0.1 mbar. The yield is 1.3 g (=91% of theory).

This complex has the particular feature that the chitosan polyelectrolyte is obtained from biological raw materials and is fully biodegradable. It is produced from crab shells, a waste product of the fishing industry.

1.9 Polystyrenesultonate-Hoe-L-3658-1

2.5 g (40% w/w) of the cationic surfactant Hoe-L-3658-1 are dissolved in 500 ml of deionized water and the pH is adjusted to 9 using aqueous sodium hydroxide solution (10% w/w). A solution of 0.55 g of polystyrenesulfonate sodium salt (PSSNa, 2.7 mmol) in 100 ml of deionized water is added slowly (1 drop per second) with stirring at 60° C. A fine brownish precipitate is produced which is filtered off using a Büchner funnel, washed (with 3 times 20 ml of water conditioned at 60° C.) and dried in a vacuum drying cabinet at 30° C. and 0.1 mbar. The yield is 1.4 g (=89% of theory, assuming 1.38 g of $C_6F_{13}CH_2CH_2N(CH_3)_3CH_3SO_4$).

2. Preparation of Aqueous Emulsions 3.0 g of poly(trimethylammonium-propylacrylamide)-Fluowet SB® are mixed thoroughly with 20 g of liquid Fluowet OTN® (Hoechst AG). This first step gives a homogeneous white viscous mass. In the second step, this concentrate is diluted in portions with water, e.g., 20, 40, 100 or 200 ml. Care should be taken to ensure thorough homogenization. In this process, a finely divided emulsion is obtained from the mesomorphic powder. The proportion of emulsifier can be varied greatly. For example, as above, 6 g of complex and 10 g of emulsifier, or 12 g of complex and 10 g of emulsifier, are used. All emulsions are stable at 20° C. over a period of at least 2 weeks.

3. Coating of an Aluminum Surface with Fluoro Complex Emulsion and the Removal of Graffiti An aqueous emulsion consisting of 10 g of poly(N,N,N-trimethylammonium-3-propylacrylamide)-Fluowet SB® complex, 10 g of Fluowet OTN® solution and 40 ml of water, prepared in accordance with Example 2) is applied by brush to a 200×200 mm aluminum panel (aluminum F22) over an area of 100×100 mm. The emulsion is dried at 18–20° C. and an atmospheric humidity of 70% overnight (about 12 h). The panel is sprayed with a commercial acrylic paint (Auto-Color, fast-drying, color shade 6-12, Vogelsang GmbH) and the paint is cured for 48 h. The panel was subsequently rubbed down under gentle pressure with a solution of rinsing agent (Pril Supra, Henkel) at 30° C. using a sponge (Glitzi rinsing sponge). With this treatment, the paint is detached completely from the coated area within 30 s. On the uncoated comparison surface of the same panel, the paint remains adhering intact.

4. Coating of Vehicle Parts with Emulsions

An aqueous emulsion (consisting of 3 g of poly(N,N,N-trimethylammonium-3-propylacrylamide)-Fluowet SB® complex, 20 g of Fluowet OTN® solution in 200 ml of water, prepared in accordance with Example 2) is applied to an automobile wing using a commercial pump atomizer and rubbed down with a cotton cloth. Under rainfall, large coherent droplets are formed on uncoated sections of paint, whereas the water runs off completely from the coated areas. Depending on the emulsifier content, this effect persists for varying periods of time. In the case of the high emulsifier concentration used in this case, the effect disappeared gradually. After ten severe rainfalls, an effect was no longer detectable. No alteration of the paint by the coating was found. It is therefore possible to prepare emulsions of the complexes for temporary coatings of painted surfaces.

5. Coating of Painted Surfaces and the Removal of Inscriptions

An acrylic paint surface is coated uniformly using a laboratory atomizer with 10 percent strength by weight complex solutions. After from 1 to 5 minutes, a dry transparent complex film has formed on the painted surface. The surface energies are determined using the sessile drop method. In all cases, the surface energies found are below that of Teflon (20.2 mN/m). The precise figures are given in the following table.

TABLE 3

| Complex material | Surface energy in mN/m |
| --- | --- |
| Polyethyleneimine perfluorooctanoate | 12 |
| Poly(trimethylammonium-propyl-acrylamide) perfluorooctanoate | 16 |
| Poly(trimethylammonium-propyl-acrylamide)-Fluowet SB ® | 14 |
| uncoated | 57 |

Subsequently, all areas are inscribed using an Edding 400 permanent marker. The inscription can be removed without problems from the coated areas using a cotton cloth and nail varnish remover (acetone) or N-methyl-pyrrolidone, without damage to the acrylic paint. In contrasts on the uncoated comparison surface, the paint starts to break up immediately on treatment with acetone and remains adhering to the cloth.

6. Coating of an Aluminum Surface 10 ml of a two percent strength by weight alcoholic complex solution are applied uniformly to a 200×200 mm aluminum panel using a laboratory atomizer (Aldrich) under a pressure of 1 bar. Evaporation of the solvent leaves a completely transparent film on the panel which can just be seen with lateral incidence of light. The amount of substance used and the material density of approximately 1.6 g/cm³ gives a coat thickness of about 3 μm. Measurement of the surface energy by the sessile drop method gives a value of about 18 mN/m (measurement with hexadecane) and is therefore considerably below the value found for polytetrafluoroethylene (20.3 mN/m). It can therefore be shown that by using even very small amounts of substance a high-energy metal surface can be transformed very easily into an ultralow-energy surface. In contrast to polytetrafluoroethylene, no adhesion promoter is necessary for the coat.

7. Icing on a Coated Aluminum Surface

The prevention of ice formation on aerofoils possesses a high application potential in both civilian and military air travel. In these sectors, extensive operations are necessary in the winter months in order to de-ice the aerofoils. The icing-up of aerofoils constitutes a considerable safety risk in air transport. Therefore, the icing behavior of coated aluminum plates is investigated. Coating takes place in accordance with Example 6. In the test, a 200×200 mm aluminum plate is cooled to temperatures of −50° C. and the icing behavior is recorded.

The experimental setup consists of a 20 cm diameter Dewar flask filled with liquid nitrogen, in which there is a solid cuboid aluminum block with an edge length of 15 cm. The top edge of the aluminum block projects 2–3 mm above the upper edge of the Dewar flask. For temperature measurement, a Ni-chromium/Ni thermocouple is mounted in the center of the aluminum panel. The panel is placed on the aluminum block and this time is defined as t-0. The course of icing is monitored over a period of 2 hours. The experiment is carried out first with the uncoated plate and repeated in a second experiment with the identical but coated plate. Coating takes place in accordance with the preceding example. During the experiment the air temperature is 19° C. and the relative atmospheric humidity is 70%.

The results are collated in the table below. The uncoated aluminum plate fogs up spontaneously when it is placed on the cooled aluminum block. After just 1 minute, a clearly visible, thin layer of ice has formed. In comparison, in the case of the coated plate there is no spontaneous fogging and after one minute no icing is observed. After 11 minutes, a considerable layer of ice with a thickness of 1–2 mm has already formed on the uncoated plate. At the same point in time, in the case of the coated plate, incipient icing is found. This incipient icing is comparable with that observed after just 1 minute in the case of the uncoated plate. After 30 minutes a coherent layer of ice is found on both plates but with different thicknesses: in the case of the uncoated plate its thickness is about 5–6 mm and in the case of the coated plate about 1–2 mm. That is, it is considerably thicker in the case of the uncoated plate. Over the course of 120 minutes, the layers of ice grow to thicknesses of 8–9 mm in the case of the uncoated plate and to 5–6 mm in the case of the coated plate. In this time, a total of 15 g of ice has deposited on the uncoated plate measuring 400 cm² and with a mass of 100 g, whereas on the coated but otherwise identical plate only 10 g of ice were found. This experiment shows that in the case of the coated plate a considerable delay in icing is observed. Surprisingly, the coating has a surface structuring which greatly reduces the formation of ice nuclei.

In the second part of the experiment an attempt is made to remove the ice layer formed on the plates after two hours using a coolant spray. Using the coolant spray (Super 75, Kontakt Chemie, CRC Industries Deutschland GmbH), which permits cooling down to −52° C., the plate is sprayed front a distance of about 10 cm and thus the attempt is made to remove the ice. It is found that the adhesion of the ice on the coated plate is greatly reduced relative to that on the uncoated plate. The ice can be removed almost completely from the coated plate by spraying with the coolant spray, something which is not possible in the case of the uncoated plate. The ice layer at the edges of the plate cannot be removed by simple spraying, since the plate edges are uncoated and at the edge of the plate there is therefore strong ice adhesion as in the case of an uncoated plate. The uncoated thermocouple lying on top of the plate also remains covered by ice. This part of the experiment demonstrates that the adhesion of the ice layer is greatly reduced by coating. Consequently, there is a synergistic action of the coating on icing such that both icing is retarded and the adhesion of ice which has formed is reduced. Both effects are advantageous for reducing aerofoil icing in air travel.

TABLE 4

| Time/min | Plate uncoated | Plate, coated |
|---|---|---|
| 1 | Temperature: −9° C. | Temperature: −10° C. |
|   | Plate fogs up spontaneously | Plate does not fog up |
|   | Icing | No icing |
| 11 | Temperature: −50° C. | Temperature: −52° C. |
|   | Ice layer about 1–2 mm thick | Plate fogs up |
| 30 | Temperature: −55° C. | Temperature: −58° C. |
|   | Ice layer about 5–6 mm thick | Ice layer about 1–2 mm thick |
| 120 | Temperature: −57° C. | Temperature: −60° C. |
|   | Ice layer about 8–9 mm thick | Ice layer about 5–6 mm thick |

8. Coating of a Microporous Polymer Membrane

The surface modification of plastics is of great interest for an innumerable number of very different applications. Consequently, it is investigated in the experiment below whether it is possible to produce pore-free films on polymer surfaces with the aid of the complexes described. Further underlying questions relate to the size of the amounts of substance required and to the gas permeation properties possessed by these films.

A suitable support material for investigating all three objectives is Celgard 2400 (Hoechst Celanese Corporation). Celgard 2400 comprises microporous membrane films of polypropylene and polyethylene having slit-shaped pores measuring 0.04×0.12 μm and having a porosity of 41%.

Coating with the complexes of the invention is effected by immersing a DIN A 4-sized Celgard 2400 film into an alcoholic solution of the complex. The weight fraction of the complexes is from 0.5 to 10%, preferably 2%. The Celgard film is removed from the solution and excess solution is stripped off between two rollers. After evaporation, with drying of the solvent, the permeabilities for the gases nitrogen, oxygen and carbon dioxide are measured at room temperature. The film preparation time at room temperature is from 10 to 60 minutes, typically 30 minutes.

The results of gas permeation measurements can be summarized as follows: coherent impervious films are found starting from an occupation density of from 5 to 15 g/cm². That is, all pores of the Celgard film are closed. These films are impervious up to gas pressures of at least 5 to 10 bar overpressure. The gas permeation properties show that the complex coatings of the invention are suitable for selective gas separation. For instance, at 5 bar overpressure, a coating of poly(trimethylammonium chloride-propylacrylamide)-Fluowet SB® complex (6.62 g/m²) exhibits a permeability for carbon dioxide which is 1.6 times that to nitrogen, and a permeability for oxygen which is 1.2 times higher than that for nitrogen. Likewise at 5 bar overpressure, a coating of 6,3-ionene-Zonyl TBS® on Celgard (11.26 g/m$^2$) exhibits a selectivity to carbon dioxide which is 1.2 times higher than that to nitrogen and a selectivity to oxygen which is 2.0 times higher than that to nitrogen.

The gas permeation measurements show that it is possible in a very simple way co close the pores of the Celgard film with very small amounts of substance. The films which form as a result of coating possess outstanding pressure stabilities. With an amount of substance of from 5 to 10 g/m$^2$ and a density of about 1.6 g/m$^2$, the coat thicknesses are 3–6 μm. The gas permeability of the films deviates greatly from the diffusion-controlled Knudsen flow which is found for a porous material. Furthermore, the permeability can be controlled for individual gases. Poly(trimethylammonium chloride-propylacrylamide)-Fluowet SB® exhibits high carbon dioxide permeability while 6,3-ionene-Zonyl TBS® exhibits high oxygen permeability. This experiment demonstrates that stable polymer coatings consisting of thin complex films can be produced. Furthermore, the simple preparation process, low coat thicknesses, high pressure stability, and variable selectivity to various gases suggest a high application potential for a great variety of gas separation processes.

9. Coating of Building Materials with Dissolved Complexes and the Removal of Graffiti Dissolved fluorinated complex material is applied using a laboratory atomizer to plates measuring 200×200 mm made from different materials (granite, sandstone, marble). In each case, half of the plate is covered, giving a surface region protected by complex, and an unprotected region. The drying time is from 30 to 60 minutes. After this time, the solvent has evaporated and a transparent film has formed. This film is imperceptible or only just perceptible when viewed at an oblique angle.

After 2 days, both the protected and the unprotected surfaces are sprayed with acrylic paint (Auto-Color, fast-drying, color shade 6-12, Vogelsang GmbH) and the paint is cured for 48 h. Subsequently, the spray coating can be removed without residue from the coated surfaces using nail varnish remover (acetone) or N-methyl-pyrrolidone and a paper towel. On the comparison surfaces, on the other hand, there are considerable paint residues remaining.

10. Coating of Paper with Dissolved Complexes and the Removal of Inscriptions

Dissolved complex material is applied using a pump atomizer to different papers and magazines (format: DIN A4). Evaporation of the solvent leaves a visually imperceptible film. The substrates prepared in this way are daubed with an Edding 400 permanent marker. The daubing is removed without residue from the coated papers using an ethanol-soaked paper towel. On uncoated comparison material, the ink runs into the paper fibers and its removal is impossible.

11. Surface Energies of the Coatings

For quantitative detection of the change in the surface properties as a result of coating with complexes, contact angle measurements are carried out by the sessile drop method of Neumann and Li (J. Coll. Interf. Sci. 148 (1992), 190) using the contact angle measuring instrument G10 from Kruss (Germany). From the measured contact angles, the surface energies are calculated by the Young equation. The measurements are carried out using hexadecane as the test liquid. For all of the complexes of the invention set out in the synthesis examples, surface energies of between 13 and 20 mN/m are found. These values are independent of the nature of the support material. For glass, painted metal parts, untreated aluminum, coated paper, and sandstone, the values found are the same in each case. From this it is possible to conclude that fluorine-containing groups ($CF_2$ and $CF_3$) accumulate at the film/air interface in the case of all the substrates investigated. The surface energies of typical uncoated materials are 50 mN/m for wool, 50 mN/m for iron, 36 mN/m for polystyrene, 23 mN/m for polydimethylsiloxane, and 20.3 mN/m for polytetrafluoroethylene. Consequently, the values found for the coatings are still well below those of the last two materials, which represent the standards for low-energy surfaces.

In all cases, a different but significant hysteresis between the advancing and the receding angle is found, which depending on the material and the preparation conditions of the coating lies between 5 and 20°. This can be explained by surface roughnesses in the microscopic range. For polytetrafluoroethylene, the literature reports 116° (13.7 mN/m) for the advancing angle and 920 (28 mN/m) for the receding angle. This gives a considerable hysteresis of 240 for polytetrafluoroethylene. Consequently, the complexes of the invention exhibit a much lower hysteresis.

PCT/EP95/02934 describes self-cleaning surfaces based on systematic rises and dips with distance of from 5 to 200 μm and height differences of from 5 to 100 μm. Surfaces of this kind are widespread in nature and exhibit no significant hysteresis in contact angle measurements. Owing to the structuring of the surface, the droplets of the test liquid are unable to wet the surface, since it has few, and small, areas of contact with the substrate. In the case of fluorosurfactant complexes described here, the hystereses found are clear evidence that no such surface structuring is present.

12. Characterization of the Surfaces by EX and EDX Analysis

Figure 1:
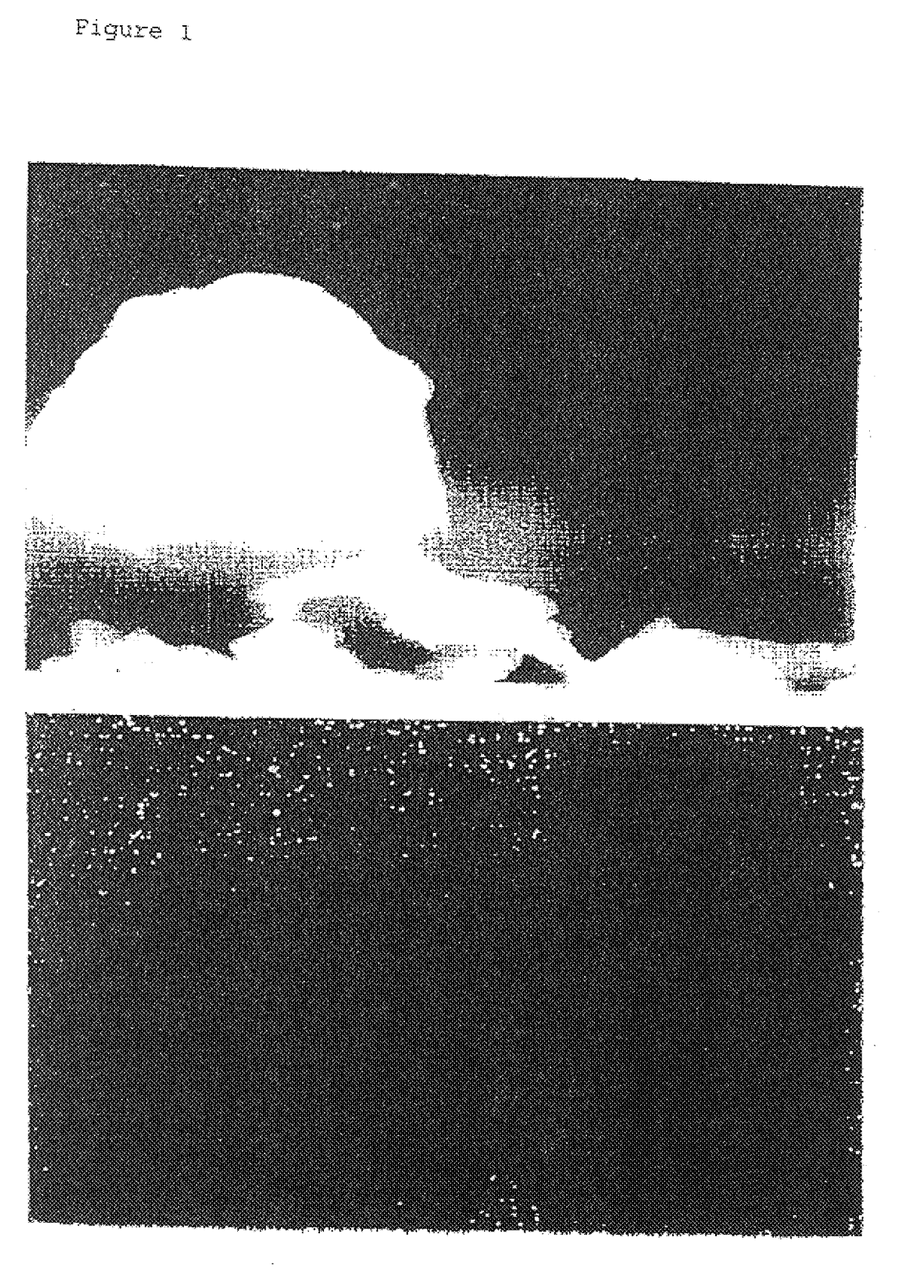
FIG. 1 shows the fracture edge of the film of a complex of the invention, imaged in the scanning electron microscope (top) and in a fluorine-specific EDX analysis (bottom)

A film of the poly(trimethylammonium chloridepropylacrylamide)-Fluowet SB® complex is cooled for 2 minutes in liquid nitrogen, the film thus embrittled is fractionated, and the fractured edge is imaged in the scanning electron microscope (SEM). The top image in FIG. 1 shows a fracture edge of this kind at an acceleration voltage of 20 kV and a magnification of 5000. The light-colored fracture edge and the film surface, which appears dark, are readily perceptible. The rounded-off fracture edge in the left-hand half of the image possesses a diameter of about 5 μm.

The film is subsequently analyzed by EDX (energy dispersed X-ray) specifically for the presence of fluorine ($F_{K\alpha}$= 0.2675 keV). The measurement of the same fracture edge as in the SEM micrograph is shown in the bottom image in FIG. 1. The light-colored spots are classified as regions of high fluorine content. It is noted that the film surface which appears dark in the SEM is covered by numerous spots whereas the fracture edge which appears light-colored in the SEM has only a few such spots. This means that the surface is greatly enriched in fluorine relative to the bulk material and the fluorine groups ($CF_2$ and $CF_3$) are thus in fact, as is preferred, located on the film surface.

13. Comparison of Surface Energy and Water Absorption

For the usefulness of the coating materials in the architectural sector, it is important that they do not give a watertight seal to the surfaces. They must, therefore, be able to absorb water. If, however, they absorb too much water and swell too severely, then they are likewise unusable. It is therefore necessary to be able to control the water absorption. Using the example of the complexes of perfluorodecanoic acid with the copolymers of diallyldimethylammonium chloride (DADMAC) and of N-methylvinylacetamide (NMVA), the intention is to demonstrate the very considerable extent to which it is possible to vary the water absorption capacity for an approximately constant surface energy. This is done with the same surfactant, the perfluorinated decanoic acid, by altering the copolymer composition. The water absorption of these complexes at 20° C. and 100% relative atmospheric humidity increases with increasing DADMAC content from 1.4% (25%DADMAC) to 6.1 (99% DADMAC).

TABLE 5

| DADMAC/NMVA | Water absorption [%] | Surface energy [mN/m] |
|---|---|---|
| 25:75 | 1.4 | 14.0 |
| 47:63 | 3.6 | 13.5 |
| 65:35 | 3.8 | 14.6 |
| 83:17 | 4.8 | 14.7 |
| 100:0 | 6.3 | 15.6 |

14. Small-angle X-ray Scattering

All of the complexes investigated are analyzed by means of small-angle X-ray scattering. It is found that in each case the structure present resembles that of a liquid crystal. This is evident from small-angle reflections which correspond to a Bragg spacing of between 1 and 100 nm. In this respect, the behavior of the fluorinated complexes is similar to that of the nonfluorinated complexes described in DE 4428641. In that case, however, it is emphasized that following precipitation from aqueous solution the complexes are amorphous (no small-angle reflections). They are then dissolved in an organic solvent and, in a third step, are filmed. In that case, again, it is especially emphasized that a mesomorphic order is present only after filming from organic solvent (small-angle reflections occur).

In the case of fluorinated complexes, in contrast, we find the same small-angle reflections both following precipitation from aqueous solution and following filming from an organic solvent; in other words, a mesomorphic structure is present directly in the aqueous medium as early as at the complexing stage.

15. Wide-angle X-ray Scattering

The coatings only possess high transparency when they do not possess crystallinity. This can be found very rapidly and easily by means of wide-angle X-ray measurements.

Figure 2:
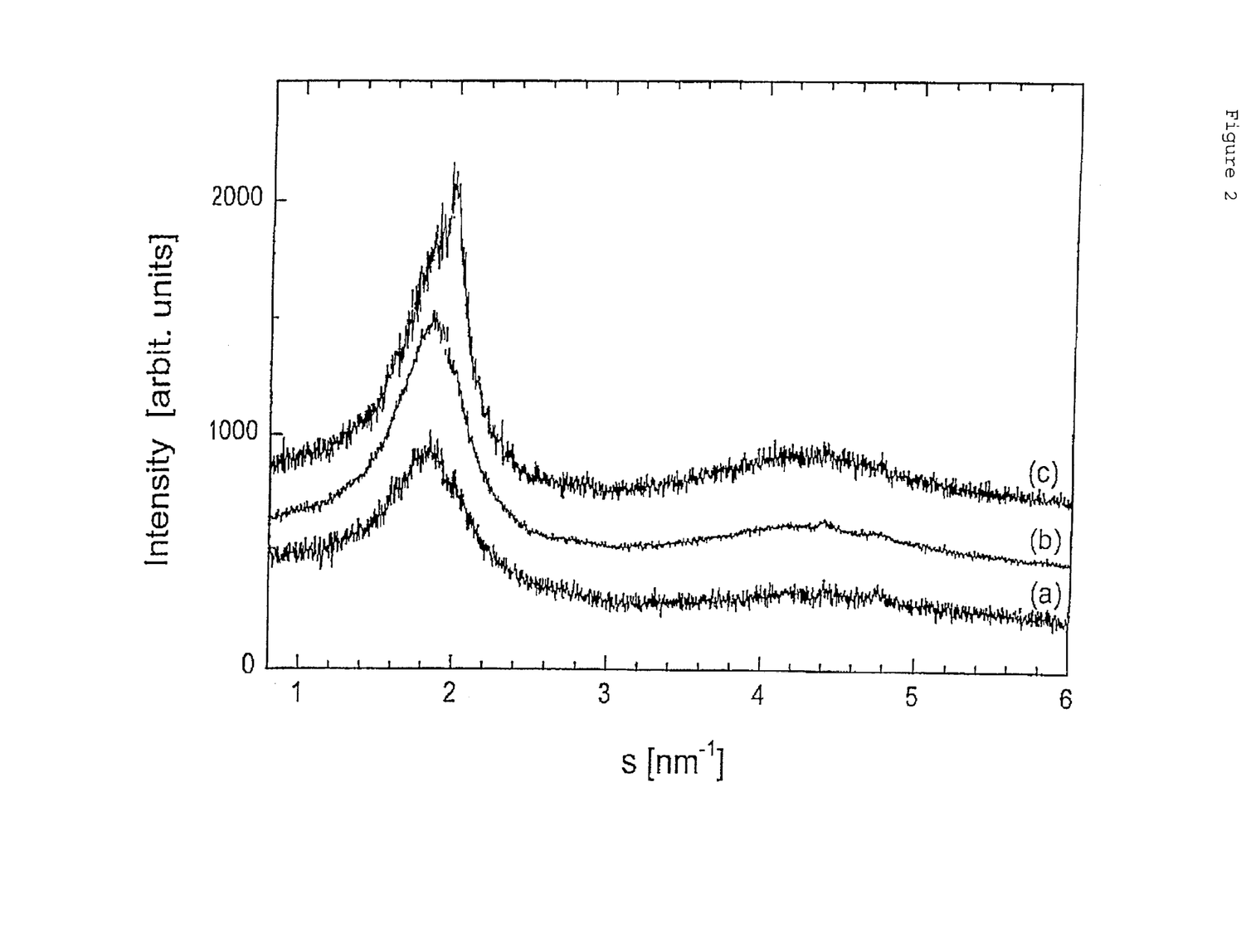
FIGS. 2 and 3 show wide-angle X-ray diffractograms of polyelectrolyte-fluorosurfactant complexes.
Figure 3:
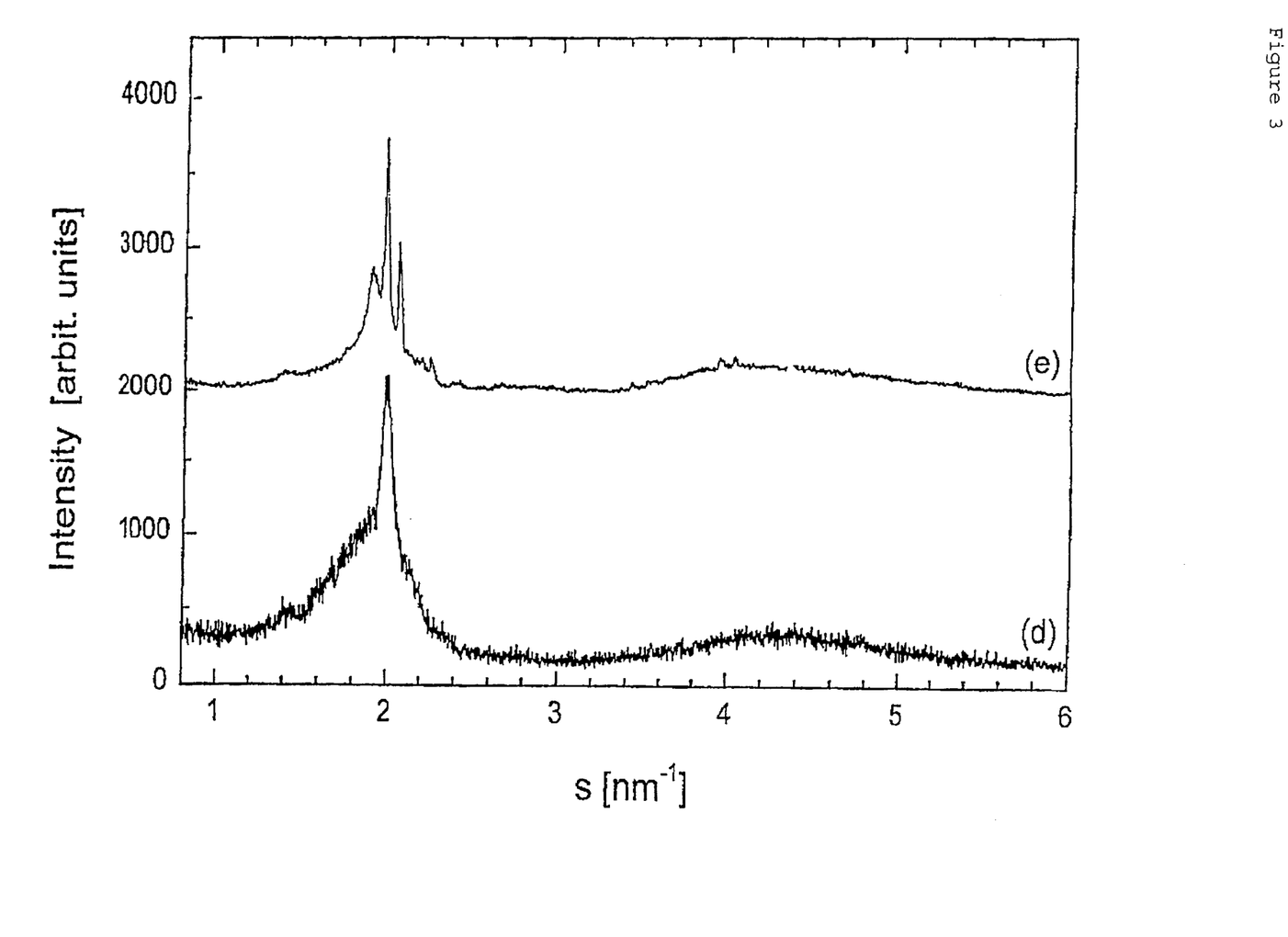

In the case of the complexes of the invention, only a few broad reflections are found. Typically, an intense reflection is found at about 1.9 nm$^{-1}$ and a weaker reflection at about 4.2 nm$^1$ (see FIG. 2). As soon as crystallinity occurs, a number of, or numerous, narrow reflections are found in the wide-angle diffractogram. In the region around 2 nm$^{-1}$ at least two sharp reflections can be observed. This is illustrated in FIG. 3. The diffractogram 3d shows a complex which is still among the complexes of the invention. It possesses only one, albeit narrow, reflection around 2 nm$^{-1}$. In the diffractogram 3e, a number of reflections can be observed within this region. In other words, the complex is crystalline and is no longer one of the complexes of the invention.

In addition to clear analysis, the wide-angle x-ray diffractograms also make it possible to demonstrate the effect of the copolymers on the structure. The diffractograms 2a to c, and 3d, relate to poly(diallyldimethylammonium-co-N-methyl-N-vinylacetamide) perfluorodecanoate (see syntheses). The diallyldimethylamonium content of the copolymers is 25% (a), 47% (b), 65% (c), and 83% (d). The wide-angle diffractograms demonstrate that all of the complexes containing copolymer do not possess any crystallinity. The homopolymeric poly(diallyldimethylammonium) perfluorodecanoate (3e), on the other hand, is crystalline, or at least possesses considerable crystalline fractions.

What is claimed is:

1. A complex comprising at least one nonhygroscopic polyelectrolyte and at least one oppositely charged fluorinated surfactant.

2. The complex as claimed in claim 1, whose stoichiometry based on the charges of polyelectrolyte and surfactant is about 1:1.

3. The complex as claimed in claim 1, which comprises a cationic polyelectrolyte and an anionic surfactant.

4. The complex as claimed in claim 1, which comprises an anionic polyelectrolyte and a cationic surfactant.

5. The complex as claimed in claim 1, which has a water absorption of not more than 5% (w/w), based on the weight of the complex, at 20° C. and 100% relative atmospheric humidity.

6. The complex as claimed in claim 1, comprising a nonhygroscopic cationic polyelectrolyte selected from the group consisting of polymers containing at least one monomer unit selected from ethylenically unsaturated monomers which carry positively charged nitrogen groups, polyethyleneimines and alkyl-substituted polyethyleneimines;

ionenes, and polysaccharides containing cationic groups.

7. The complex as claimed in claim 6, wherein said cationic polyelectrolyte comprises at least one monomer unit which carries a quaternary ammonium group or an N-substituted heteroaromatic group.

8. The complex as claimed in claim 6, wherein said cationic polyelectrolyte further comprises nonionic monomer units.

9. The complex as claimed in claim 6, wherein said cationic polyelectrolyte comprises a copolymer of dialkenyldialkylammonium salts and nonionic monomers.

10. The complex as claimed in claim 1, comprising a nonhygroscopic anionic polyelectrolyte selected from the group consisting of:

polymers containing at least one monomer unit selected from ethylenically unsaturated carboxylic acids and also salts and derivatives thereof, ethylenically unsaturated monomers containing sulfonic acid groups, and ethylenically unsaturated monomers containing phosphinic, phosphonic or phosphoric acid groups, and anionic polysaccharides.

11. The complex as claimed in claim 10, wherein said anionic polyelectrolyte further comprises nonionic monomer units.

12. The complex as claimed in claim 1, comprising an anionic fluorinated surfactant selected from the group consisting of:

fluorinated carboxylic acids, fluorinated sulfonic acids, fluorinated organosulfuric acids, fluorinated phosphinic, phosphonic and organophosphoric acids, and anionic derivatives or salts thereof.

13. The complex as claimed in claim 12, wherein said anionic fluorinated surfactant is selected from the group consisting of:

perfluorocarboxylic acids and salts thereof;

partially fluorinated carboxylic acids and salts thereof;

perfluorosultonic acids and salts thereof;

partially fluorinated sulfonic acids and salts thereof;

fluorinated phosphinic and phosphoric acids and salts thereof;

fluorinated phosphoric acids and salts thereof, and fluorinated esters which carry at least one charged group.

14. The complex as claimed in claim 1, comprising a cationic fluorinated surfactant selected from fluorinated amines and ammonium salts.

15. The complex as claimed in claim 1, which further comprises at least one nonionic surfactant.

16. The complex as claimed in claim 15, which comprises at least one nonionic fluorinated surfactant.

17. The complex as claimed in claim 15, which comprises said nonionic surfactant in a proportion of up to 200% (w/w) based on the weight of the complex.

18. A method of preparing a complex as claimed in claim 1, which comprises adding an aqueous solution of the polyelectrolyte to an aqueous solution of the fluorinated surfactant and isolating the resultant precipitate.

19. A method of preparing a complex, which comprises adding the particular desired amount of nonionic surfactant to a complex as claimed in any of claims 1 to 7.

20. A formulation which comprises a complex as claimed in claim 1, in solution in a polar organic solvent.

21. The formulation as claimed in claim 20, wherein said solvent is selected from methanol, ethanol, acetone, ethyl acetate, and mixtures thereof.

22. The formulation as claimed in claim 20, wherein said complex is present in a proportion of from 0.1 to 30% (w/w) based on the weight of the solution.

23. A formulation which comprises a complex as claimed in claim 1 in emulsion in an aqueous solvent.

24. The formulation as claimed in claim 23, wherein said complex is present in a proportion of from 0.1 to 30% (w/w) based on the weight of the emulsion.

25. The formulation in claim 24, wherein said emulsion is stable for at least two weeks at 20° C.

26. A method of preparing a formulation; which comprises adding the particular desired amount of a nonionic surfactant to a complex as claimed in any of claims 1 to 7, converting the resulting mixture into a substantially homogeneous mixture, and diluting the mixture with water in order to obtain an aqueous emulsion.

27. A method of coating a surface, which comprises applying to said surface a formulation as claimed in claim 25 and drying it.

28. The method as claimed in claim 27, wherein said applying takes place from a solution.

29. The method as claimed in claim 27, wherein said applying takes place from an aqueous emulsion.

30. The method as claimed in claim 27, wherein said applying takes place discontinuously or continuously by spraying, flow coating, dipping or mechanical application.

31. The method as claimed in claim 27, wherein the coating is applied in a thickness of from 0.1 $\mu$m to 1 mm.

32. The method as claimed in claim 28, wherein the drying time is not more than 1 hour.

33. The method as claimed in claim 29, wherein the drying time is not more than 6 hours.

34. An article which is coated at least in part with a complex as claimed in claim 1.

35. The article as claimed in claim 34, wherein the coated surface has an energy of less than 20 mN/m.

36. The article as claimed in claim 35, wherein the coating is substantially transparent.

37. The article as claimed in claim 34, wherein the coating is permeable to air and/or moisture.

38. The article as claimed in claim 34, wherein the coating is stable on contact with a water-containing atmosphere.

39. The article as claimed in claim 34, wherein the coating is stable up to a temperature of 100° C.

40. The article as claimed in claim 34, wherein the coating is enriched with fluorine at the surface facing the surroundings.

41. The article as claimed in claim 34, wherein the coating has a water absorption of not more than 5% (w/w), based on the weight of the complex, at 20° C. and 100% relative atmospheric humidity.

42. A complex comprising at least one polyelectrolyte, at least one oppositely charged fluorinated surfactant and at least one non-ionic surfactant.

43. A method of preparing the complex of claim 42, comprising adding an aqueous solution of the polyelectrolyte to an aqueous solution of the fluorinated surfactant and isolating the resultant precipitate.

44. A method of preparing a complex comprising at least one polyelectrolyte, at least one oppositely charged fluorinated surfactant and at least one nonionic surfactant comprising adding an nonionic surfactant to a complex comprising at least one polyelectrolyte and at least one oppositely charged fluorinated surfactant.

45. A formulation which comprises the complex of claim 42 in solution in a polar organic solvent.

46. A formulation which comprises complex comprising at least one polyelectrolyte and at least one oppositely charged fluorinated surfactant in emulsion in an aqueous solvent.

47. A method of preparing a formulation comprising adding an nonionic surfactant to a complex comprising at least one polyelectrolyte and at least one oppositely charged fluorinated surfactant, converting the resulting mixture into a substantially homogeneous mixture, and diluting the mixture with water in order to obtain an aqueous emulsion.

48. An article having a surface coated with the complex of claim 42.

49. A method of coating a surface comprising coating a surface with the complex of claim 42.

* * * * *